United States Patent [19]

Potts

[11] Patent Number: 4,623,163

[45] Date of Patent: Nov. 18, 1986

[54] TRAVEL CHAIR FOR HANDICAPPED INDIVIDUALS

[76] Inventor: Vinson S. Potts, 20 Cunningham Pl., Cherry Hill, N.J. 08003

[21] Appl. No.: 796,637

[22] Filed: Nov. 8, 1985

[51] Int. Cl.[4] .............................................. B62B 11/00

[52] U.S. Cl. .................................. 280/649; 16/35 R; 188/2 F; 280/650; 280/47.38; 297/5; 297/56

[58] Field of Search ................. 16/35 R; 188/2 F, 19, 188/20, 21, 29; 297/5, 6, 56; 280/649, 650, 657, 47.34, 47.38, 264

[56] References Cited

U.S. PATENT DOCUMENTS

| | | | |
|---|---|---|---|
| 1,245,317 | 11/1917 | Cashner | 280/264 |
| 2,201,440 | 5/1940 | Letourneau et al. | 280/264 |
| 2,537,521 | 1/1951 | Forbes | 16/35 R |
| 2,792,052 | 5/1957 | Johannesen | 297/5 |
| 2,976,912 | 3/1961 | Dias | 155/38 |
| 3,061,049 | 10/1962 | Bramley | 16/35 R |
| 3,256,035 | 6/1966 | Garringer | 297/6 |
| 3,887,228 | 6/1975 | Ingerson | 297/39 |
| 4,277,100 | 7/1981 | Beougher | 297/5 |
| 4,320,818 | 3/1982 | Knoche | 188/2 |
| 4,322,093 | 3/1982 | Otto | 280/650 |
| 4,359,242 | 11/1982 | Gerken et al. | 297/5 |

FOREIGN PATENT DOCUMENTS 2111440 7/1983 United Kingdom .

*Primary Examiner*—John J. Love
*Assistant Examiner*—Michael Mar
*Attorney, Agent, or Firm*—Woodcock Washburn Kurtz Mackiewicz & Norris

[57] ABSTRACT

A collapsible lightweight chair for handicapped individuals that is easily removable from an automobile and can be unfolded without requiring adjustment for the user. The travel chair comprises a lightweight wheeled base having a folding chair pivotally attached thereto. A pivoting front rail is located in front of the folding chair and extends upward from the base. Pivoting side rails extend from the chair to latching engagement with the front rail. The front rail can be pivoted to a vertical position and the side rails can be pivoted away from the front rail to allow the user to enter and exit the chair from either side, the front rail being linked to a brake mechanism for preventing rotation of the rear wheels and turning of the front wheels when it is vertically upright, the wheels being freed for turning and rotating when the front rail is angled back so that the side rails can be latched in place.

7 Claims, 7 Drawing Figures

TRAVEL CHAIR FOR HANDICAPPED INDIVIDUALS

BACKGROUND OF THE INVENTION

This invention relates to a travel chair for handicapped individuals and more particularly to a collapsible lightweight travel chair that is easily removable from an automobile and can be unfolded without requiring adjustment for the user and which does not require the user to back into it to sit down, but which may be entered from either side and which also has a provision for carrying articles.

Handicapped individuals have a need for a lightweight travel chair which differs from traditional wheeled chairs. A travel chair is needed which is lightweight, which is easily removed from the trunk of an automobile, and is collapsible and which may be unfolded and used without adjustment for the user. In addition, there is a need for a travel chair that the user does not have to back into it to sit down, but which may be entered from the side and which also has a provision for carrying articles. Various foldable wheeled chairs have been provided heretofore such as those disclosed in U.S. Pat. No. 3,887,228 and U.S. Pat. No. 4,322,093 and British patent application No. 2,111,440. However these have left something to be desired.

Accordingly it is an object of the present invention to provide a collapsible lightweight travel chair for handicapped individuals that is easily removed from an automobile and can be unfolded without requiring adjustment for the user and allows a user to enter and exit from the chair from either side. The geometry and lightness of the cart also is compatible for conveyance on private or commercial aircraft, buses or other public type transportation. Also the cart is adaptable for use in private or public institutions.

SUMMARY OF THE INVENTION

In accordance with the present invention there is provided a collapsible travel chair for handicapped individuals that is easily removable from an automobile and can be folded without requiring adjustment for the user. The travel chair comprises a wheeled base having front and rear wheels, a folding chair pivotally attached to the base and a pivoting front rail on the base located in front of the folding chair and extending upward from the base. Pivoting side rails are provided extending from the chair into latching engagement with the front rail, the front rail being pivotable to a vertical position and the side rails being pivotable away from the front rail to allow a user to enter and exit the chair from either side. A break mechanism is connected to and operable by the front rail for preventing rotation of the rear wheels of the wheeled base and turning of the front wheels when the front rail is vertically upright, the wheels being freed for turning and rotation when the front rail is moved back so that the side rails can be latched in place.

The foregoing and other objects, features and advantages of the invention will be better understood by the following detailed description and appended claims.

DESCRIPTION OF THE PREFERRED EMBODIMENT

Figure 1:
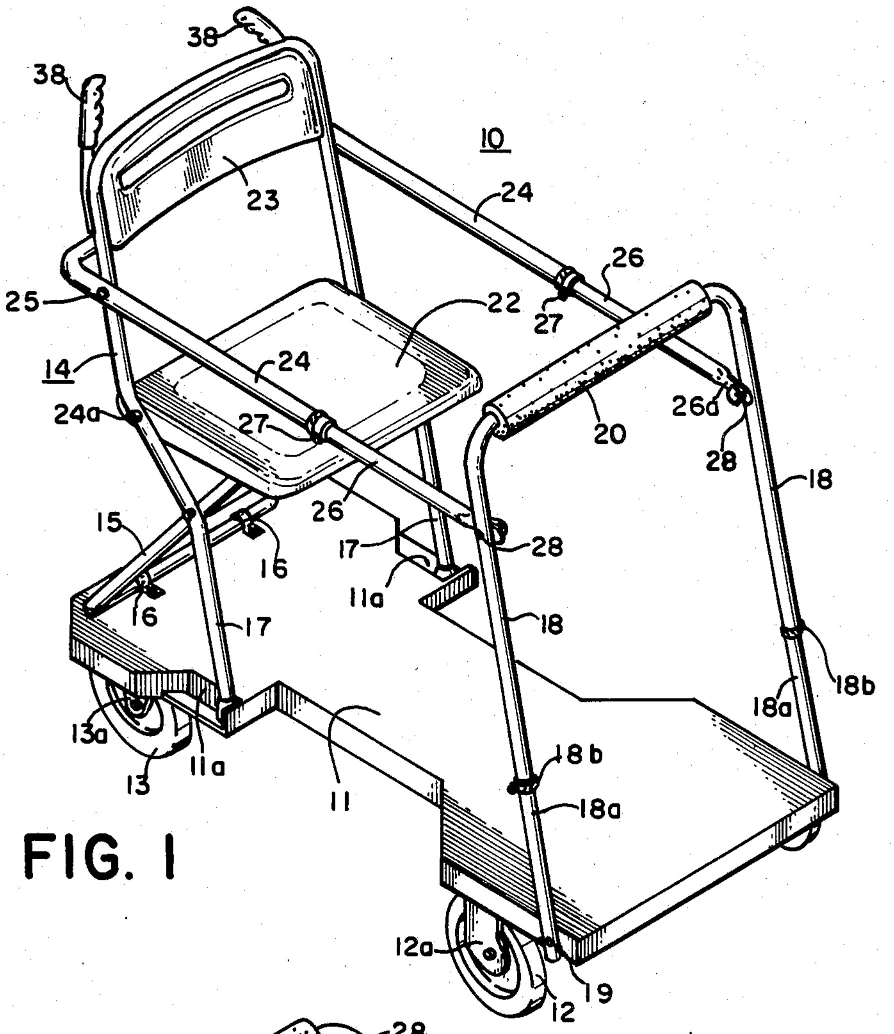
FIG. 1 is a perspective view of a collapsible travel chair embodying the present invention.
Figure 3:
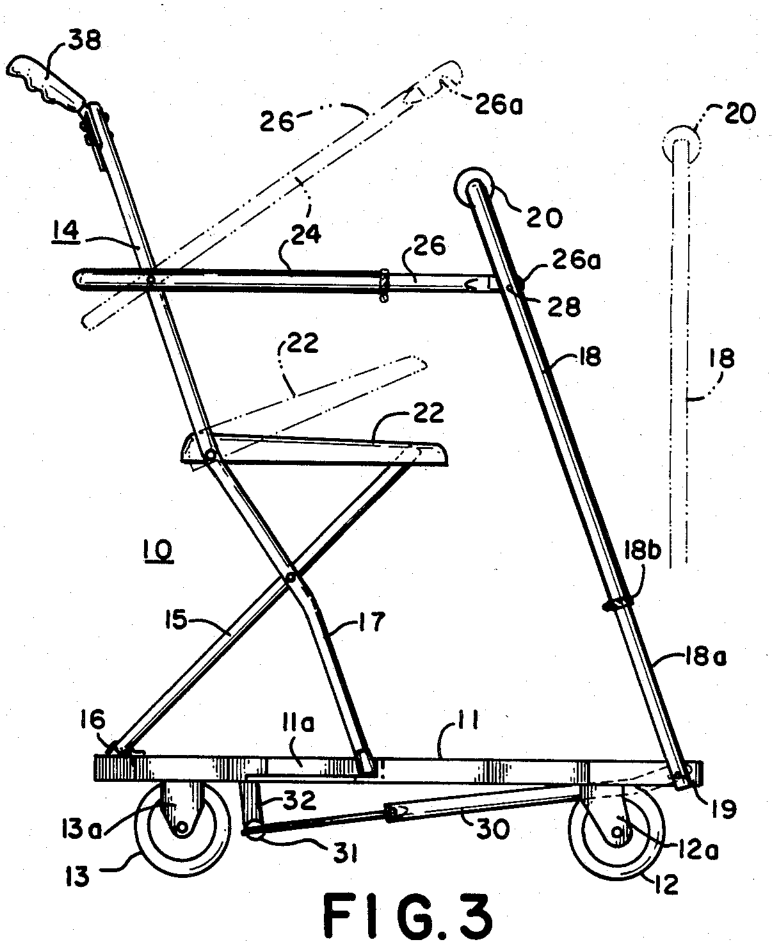
FIG. 3 is a side elevation view of the collapsible travel chair of FIG. 1 showing the front rail and side rails pivoted to two different positions.
Figure 4:
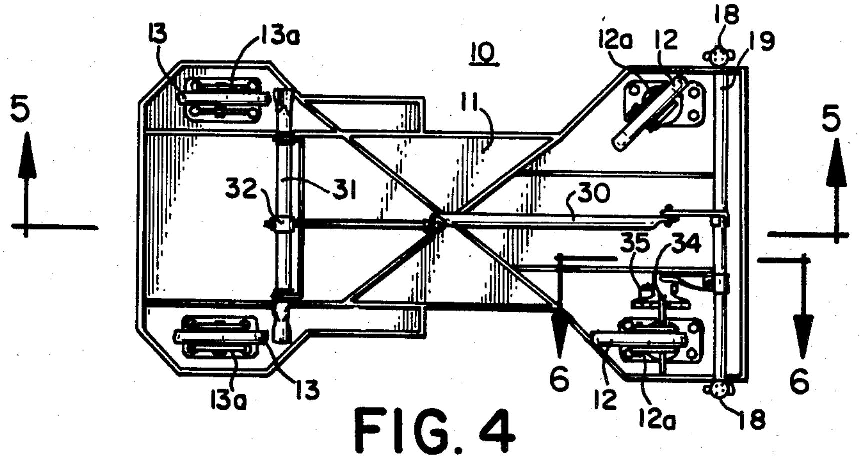
FIG. 4 is a bottom view of the collapsible travel chair illustrated in FIG. 1.
Figure 5:
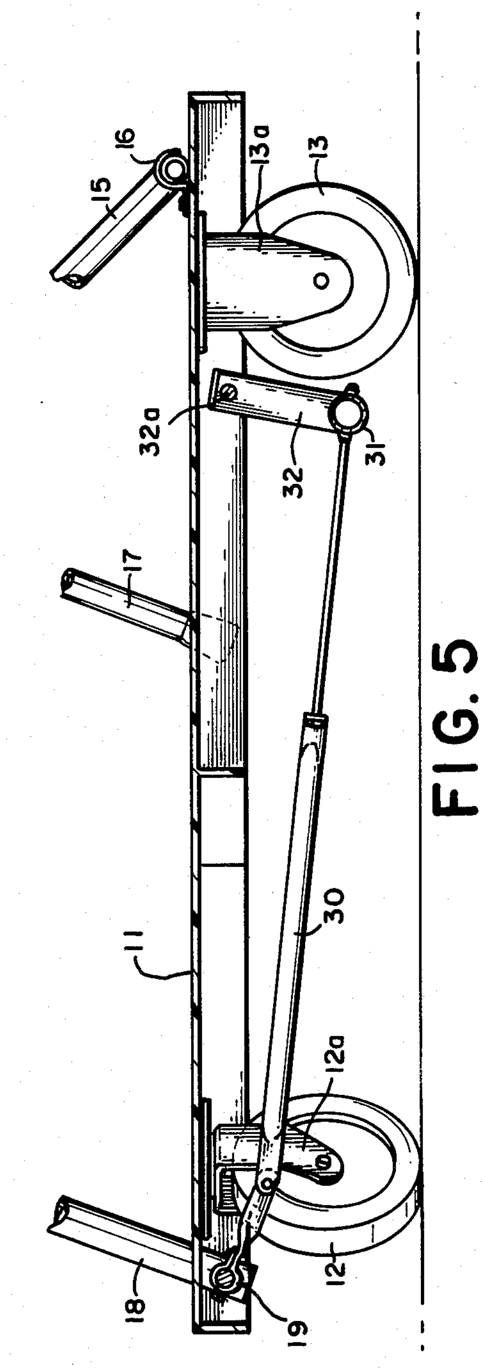
FIG. 5 is a fractional view on enlarged scale of a section of the collapsible travel chair taken along the lines 5—5 in FIG. 4.

Referring to FIG. 1 there is illustrated a collapsible lightweight travel chair 10 for handicapped individuals that is easily removable from an automobile and can be unfolded without requiring adjustment for the user. The collapsible travel chair 10 comprises a base 11 having front wheels 12 and rear wheels 13 which are secured to the bottom of the base 11. The rear wheels 13 are mounted on brackets **13*a* and the front wheels 12 are mounted on brackets 12*a* which are adapted to turn about a vertical axis as illustrated in FIG. 4. As shown in FIGS. 1 and 3 a folding chair 14 having its rear legs shaped in the form of a U-shaped member 15 is pivotally attached at 16 to the base 11. The forward legs 17 of the chair are adapted to be received in notches 11*a* in the base 11 to maintain the chair 14 in upright position as shown in FIG. 1. A front rail 18 which is U-shaped as shown in FIG. 1 is pivotally mounted on the base 11 by means of a cross bar 19 which extends under the base 11 as shown in FIGS. 4 and 5. The front rail 18 is provided with a handle 20 and has the dual function of providing a hand rest and support for the patient and for activating a braking mechanism which prevents the travel chair from moving forward, backward, left or right as later to be described. The front rail 18 is adjustable as to length by means of the telescopic members 18*a* and the screws 18*b* for locking them in fixed position. The folding chair 14 is provided with a seat 22 and a back 23 which is pivotably connected to the seat at 24. As may be seen in FIG. 1 the back 23 is supported by the tubular member which forms an extension of the front legs 17. Side rails 24 are pivotably connected at 25 to the back of the chair 14. The side rails 24 are provided with telescopic extensions 26 which are adapted to be secured in fixed position by screws 27. The extensions 26 are provided with notched ends 26*a* which are adapted to make a latching engagement with the pins 28 carried by the front rail 18**.

As may be seen in FIG. 5 the lower ends of the front rail 18 are connected to the cross bar 19 which in turn is connected to a linkage 30 which in turn is connected to a cross bar 31 pivotably supported from brackets 32 connected to the frame of base 11 at pivots **32*a*. The cross bar 31 and the linkage 30 form part of a brake mechanism which is operated by the front rail 18. As may be seen in FIGS. 4, 5 and 7 one of the front wheels 12 is associated with its bracket 12*a* which has a pin 34 extending therethrough which is adapted to be received in notches of a brake mechanism 35, FIGS. 4, 6 and 7 which is adapted to be pivotably operated by the cross bar 19**.

When the front rail 18 is moved to the vertical position as shown in phantom lines in FIG. 1 the locking mechanism 35 is lowered so that the teeth thereof engage with the pin 34 which extends through one of the supports 12*a* for the front wheel 12. This locks the front wheel 12 in fixed position so as to prevent it from turning. At the same time the front rail 18 rotates the cross bar 19 in a direction so as to cause the linkage 30 to move the cross member 31 into engagement with the periphery of the rear wheels 13 and thus lock them in position and prevent their rotation. The side rails 24 may be moved to a lowered position substantially parallel to the tubular member which forms an extension of the front legs 17 of the chair 14 and thus a patient is permitted to enter or exit the chair 14 from either side. Once the patient has entered the chair and positioned himself on the seat 22 the side rails 24 are raised and moved into latching engagement with the front rail 18 by bringing the notches 26*a* into engagement with the pins 28 on the front rail 18. This is illustrated in FIGS. 1 and 3. Handles 38, FIG. 1 are provided on the rear of the chair back 23 so that the patient may be wheeled about in the travel chair by an attendant.

Figure 6:
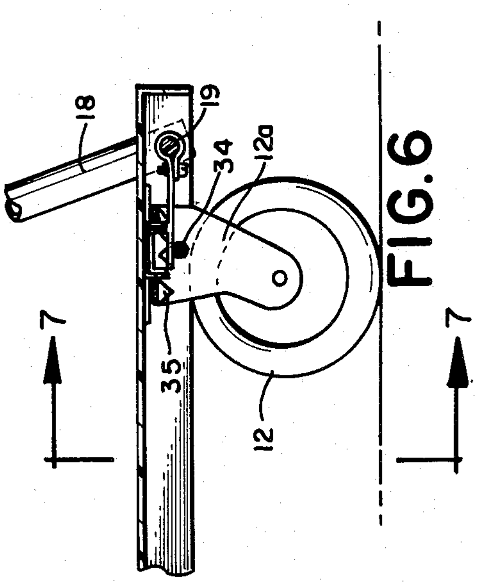
FIG. 6 is a fractional view of a section of the travel chair taken along the lines 6—6 in FIG. 4.
Figure 7:
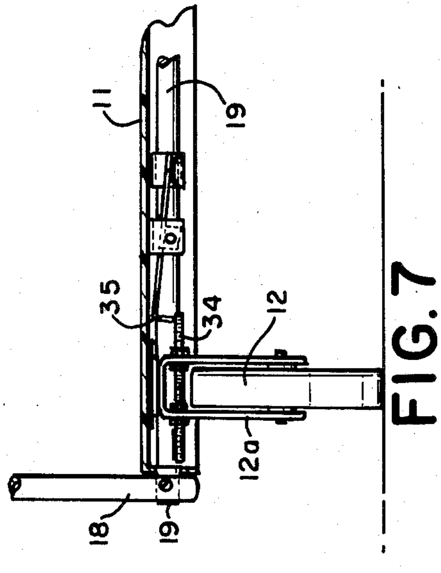
FIG. 7 is a fractional sectional view taken along the lines 7—7 in FIG. 6.

When the front rail 18 is moved from the vertical position shown in phantom lines in FIG. 3 back into latching engagement with the side rails 24 as shown in full lines in FIG. 3 and in FIG. 1 the brake mechanism comprising the cross bar 13 will be pivoted out of engagement with the rear wheels 13 as shown in FIG. 5 and the brake mechanism 35 will be moved out of engagement with the cross pin 34 shown in FIGS. 5 and 6 thereby permitting the front wheels 12 to turn as required about the vertical axis.

Figure 2:
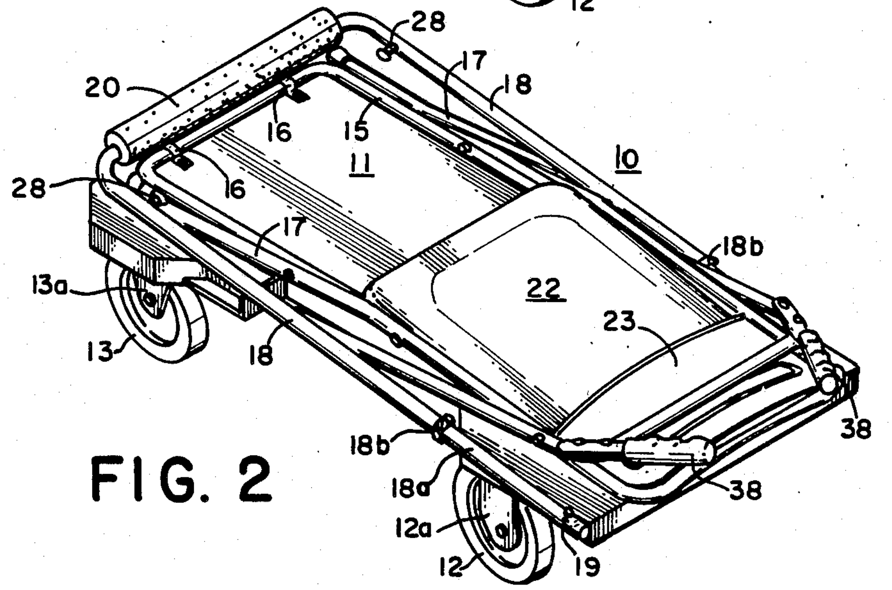
FIG. 2 is a perspective view showing the collapsible travel chair of FIG. 1 in collapsed position.

When it is desired for the patient to exit the chair 14 the side rails 24 are unlatched from the front rail 18 and the front rail is moved to the vertical position shown in phantom lines in FIG. 3. The side rails 24 are moved downwardly to the lowered position described above thus permitting the patient easy access to exiting the chair. At this time both the front and rear wheels will be locked in position as previously described. When the patient has been removed from the chair, the chair may now be collapsed so that it can be placed in the trunk of an automobile. The chair 14 is moved to a collapsed or folded position by tilting the chair backwardly as shown in FIG. 3 to remove the ends of the forward legs 17 from the notches 11*a* in base 11 and then folding the chair 14 forwardly to the collapsed position as shown in FIG. 2. The front rail 18 is then rotated to the left from the position shown in FIG. 3 and folded against the base 11 to its collapsed position as shown in FIG. 2.

From the foregoing description it will be seen that the present invention provides a travel chair for handicapped individuals which avoids the disadvantages of the prior art. The present invention is lightweight, the preferred embodiment being less than 20 pounds in weight, which is easily folded, which the occupant may enter from either side and which has a facility on the base for carrying articles. The travel chair of the present invention has a braking mechanism which is self-activated such that the device will not roll while the patient is entering or leaving the chair and the travel chair has a brace or bar which prevents the patient from falling forward from the chair.

While there has been described a preferred embodiment of the invention, it will be understood that further modifications may be made without departing from the spirit and scope of the invention as set forth in the appended claims.

What is claimed is:

1. A collapsible travel chair for handicapped individuals that is easily removable from an automobile and can be unfolded without requiring adjustment for the user, said travel chair comprising a wheeled base having front and rear wheels, said front wheels being carried by brackets pivotally mounted on said wheeled base for rotation about horizontal and vertical axes and said rear wheels being mounted for rotation about a horizontal axis, a folding chair pivotally attached to said base, a pivoting front rail mounted on said base located in front of said folding chair and extending upwardly from said base, pivoting side rails extending horizontally from said chair into latching engagement with said front rail when said chair is in an upright position, said front rail being pivotable from a rearwardly angled position while being in latching engagement with said side rails to a vertical position and said side rails being pivotable away from the front rail for permitting the user to enter and exit the chair from either side, and a brake mechanism connected to and operable by said front rail for preventing rotation of said wheels and turning of at least one of said front wheels about a vertical axis when said front rail is in said vertical position, said front wheels being freed for turning about a vertical axis and said rear wheels for rotation when said front rail is moved back to said rearward position for latching engagement with said side rails.

2. A travel chair according to claim 1 wherein said front rail is adjustable as to length.

3. A travel chair according to claim 1 wherein said side rails are adjustable as to length.

4. A travel chair according to claim 1 wherein said brake mechanism includes a cross bar connected to said front rail and adapted to engage said rear wheels for preventing rotation thereof.

5. A travel chair according to claim 1 wherein said brake mechanism includes a cross pin mounted on at least one of said brackets and associated with a notched member operated by said front bracket for preventing turning of at least one of said front wheels about a vertical axis when said front rail is in said vertical position.

6. A travel chair according to claim 1 wherein the back of said folding chair is provided with handle means for guiding the movement of said travel chair.

7. A travel chair according to claim 1 wherein said folding chair is provided with front legs and said base is provided with notches for receiving the ends of said front legs of said chair for maintaining said chair in said upright position.

* * * * *